April 23, 1940.  G. A. TINNERMAN  2,198,186
CLIP FOR MOLDINGS AND THE LIKE
Filed July 9, 1937
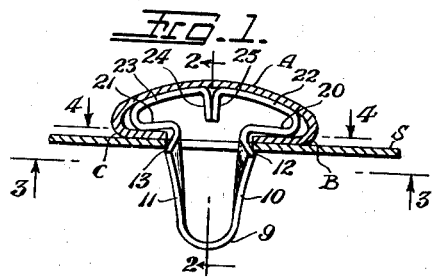
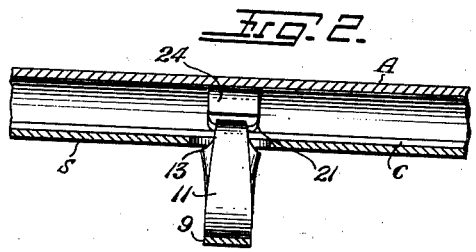
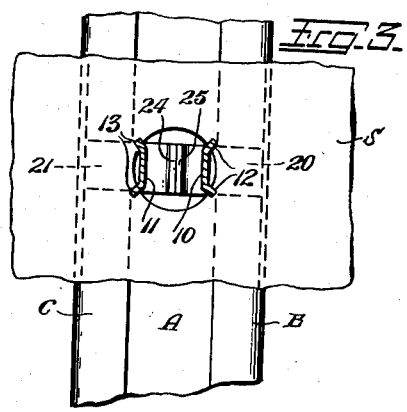
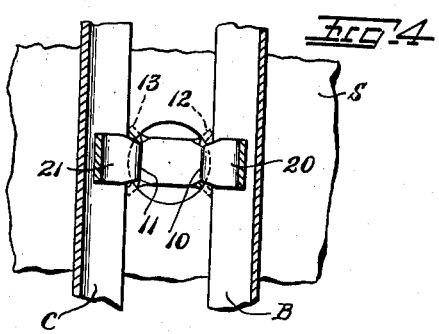
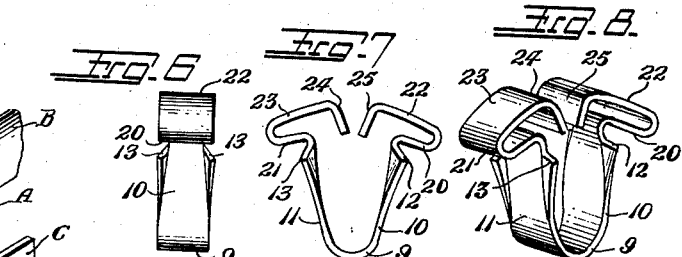
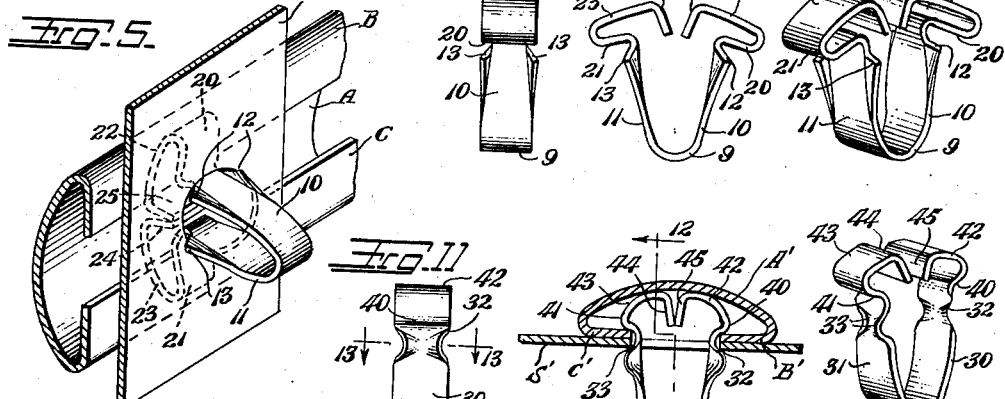
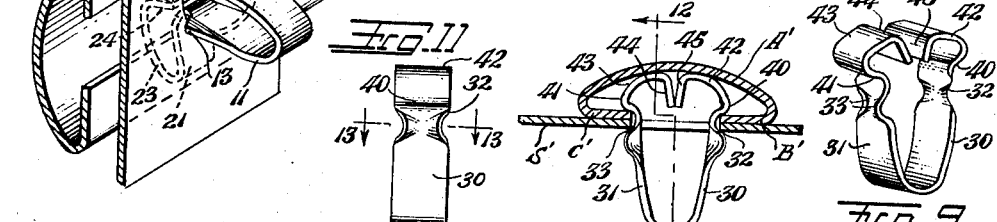
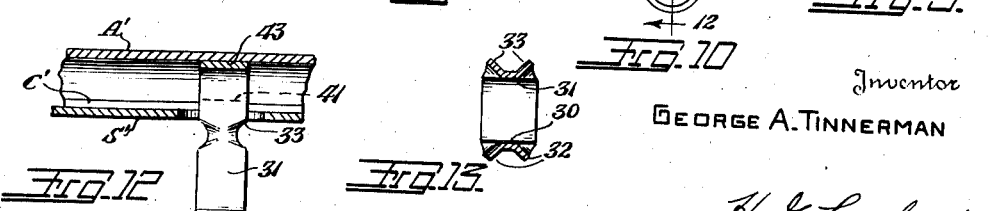
Inventor
GEORGE A. TINNERMAN
By H. G. Lombard
Attorney Patented Apr. 23, 1940

2,198,186

UNITED STATES PATENT OFFICE 2,198,186

CLIP FOR MOLDINGS AND THE LIKE

George A. Tinnerman, Rocky River, Ohio, assignor, by mesne assignments, to Tinnerman Products, Inc., Cleveland, Ohio, a corporation of Ohio Application July 9, 1937, Serial No. 152,830

14 Claims. (Cl. 85—5)

This invention relates to moldings, trim strips, and like constructions and deals particularly with improved means for securing such finishing objects to supporting surfaces, especially those readily accessible from one side only.

More particularly, this invention is directed to improved stud means or attaching clips designed for use in combination with hollow moldings and the like, whereby such moldings may be readily applied and rigidly mounted on a supporting surface by a simple assembling operation from the accessible side only of such supporting surface.

A well known method of securing a hollow molding to a supporting structure embodies the use of clip devices which are assembled with their heads in connected engagement in the moldings and their shanks projecting therefrom. These shanks are then sprung or snapped into perforations or openings in the supporting structure to retain the molding in applied mounted position.

Heretofore, such clip devices have been employed somewhat satisfactorily in certain applications and installations not subject to any great degree of movement or vibration. However, where any degree of strain, jarring or vibration is present, as, for example, takes place in the chassis of an automobile, the clip devices hertofore employed have been found objectionable and unsatisfactory in that they tend to loosen from their fastening engagement in the support and often become completely removed due to the fact that the sections or elements comprising the shanks are not possessed of sufficient inherent holding qualities in applied fastening position. It has also been found that the connections of the clips to the molding or trim strip are often loose and inefficient to such an extent that the clips become disconnected in their assembly with the molding, thereby resulting in a faulty, loose mounting of the molding and causing squeaks, rattles, and other objectionable noises.

This invention therefore contemplates a molding construction embodying attaching clips for use in mounting moldings or the like, and in which the head members of the clips comprise cooperating yieldable sections so designed as to bear resiliently against the inner walls and inturned flanges of the molding in assembled relation, whereby the clips are most efficiently connected to the molding for the operation of springing the shank elements thereof into the apertures in the supporting surface.

A further object of the invention is to provide a molding construction embodying attaching clips having head members complementarily received in the molding and comprising cooperating head sections provided with spring pressure elements disposed in abutting relation and adapted to yield to permit a ready assembly thereof with the molding, and upon being seated serve to maintain the clips in asembled relation in the molding preparatory to the application thereof to the supporting surface.

A still further object of the invention is to provide for use in such molding constructions, attaching clips having head members complementarily received therein and provided with spring pressure elements in yieldable abutting relation facilitating rapid positioning of the clips in the molding and also especially adapted for exerting extraordinary pressure on the shank or leg elements to maintain them in spaced apart relation for most effective engagement in applied position in apertures in the supporting member.

A more specific object of the invention contemplates the provision, in the shank elements of the clips employed in such molding constructions, of pronounced shoulder means so provided on the shank elements as to ensure a substantial anchored engagement thereof in the apertures in the supporting member under transverse pressure supplied by the spring pressure elements of the head sections.

Another object of the invention aims to provide for use in molding constructions, attaching clips having cooperating yieldable head sections permitting a quick assembly thereof with the molding in a substantial snap stud engagement therewith prior to the operation of mounting the same on the supporting structure.

Further objects and advantages of the invention will be apparent to those skilled in the art as a description thereof proceeds with reference to the accompanying drawing in which like reference characters designate like parts throughout the same, and in which:

Fig. 1 represents a form of the improved molding construction, the attaching clip being shown in side elevation with the molding illustrated in section;

Fig. 2 is a sectional view of Fig. 1 taken along line 2—2;

Fig. 3 is a fragmentary bottom plan taken along line 3—3 of Fig. 1 showing a portion of a molding secured by an attaching clip of the present invention;

Fig. 4 is a sectional view taken along line 4—4 of Fig. 1 looking in the direction of the arrows;

Fig. 5 is a fragmentary perspective view looking from the underside of Fig. 1;

Figs. 6, 7 and 8 are respectively, end elevational, side elevational and perspective views of the attaching clip represented in Figs. 1-5 inclusive;

Fig. 9 is a perspective of a modified form of the attaching clip;

Fig. 10 represents a molding construction embodying the modified form of clip, shown in side elevation;

Fig. 11 is an end view of the clip shown in Figs. 9 and 10;

Fig. 12 is a sectional view taken on line 12—12 of Fig. 10 looking in the direction of the arrows; and, Fig. 13 is a section taken on line 13—13 of Fig. 11.

Referring to the drawing, A represents a hollow molding or trim strip provided with the usual inturned flanges B, C, and which is to be mounted in an installation on the supporting structure S. Preparatory to the operation of mounting the molding, the supporting structure is provided, by punching or drilling, with suitably spaced apertures for receiving the shanks of the attaching clips. In many applications the supporting structure is accessible from one side only and accordingly it is expedient to provide a molding construction in which the attaching clips may be readily assembled with the molding which is then mounted on the supporting structure by springing the projecting shanks of the attaching clips into the apertures so provided by a simple axial force and, if necessary, by hammer blows applied to the outer exposed surface of the molding, a light, rubber mallet preferably being employed to prevent damage to the finish of the molding during such operation.

The preferred form of attaching clip embodied in the present invention comprises a one-piece device which may be readily constructed from an inexpensive, unitary stamping of sheet metal, cold rolled metal, spring steel or the like. Preferably the blank is obtained in the form of a substantially rectangular section which may be provided without loss or waste of material whatsoever in a well-known manner from either strip stock or stampings from sheet material. The blank is bent substantially at its center area to form a leading end 9, for the device merging into a substantially U-shaped shank or stud portion comprising shank elements 10, 11 adapted to be received in the apertures in the support. The said shank elements carry the head member of the device comprising sections 20, 21 formed into return bends to provide portions 22, 23 extending toward each other to abutting relation and conforming to the contour of the inner surface of the molding. The extremities of the said head sections are bent inwardly toward each other to provide yieldable, spring pressure elements 24, 25, disposed in abutting relation to exert a substantial transverse pressure in the head sections for a purpose hereinafter fully set forth. Intermediate the lengths of the shank elements 10, 11, pronounced shoulders 12, 13, are provided by transverse slots on their longitudinal edges permitting the adjacent longitudinal edge portions of the shank elements to be deformed out of their planes to project outwardly substantially as shown in Figs. 6 to 8 inclusive. Preferably the slots providing the shoulders 12, 13 are disposed angularly with respect to the longitudinal edges of the shank elements 10, 11, such that the shoulders presented are inclined toward the head member. By providing inclined shoulders on the shank elements an important advantage is obtained in that the attaching clips are thus adapted, within limits, for use with various thicknesses of supports such that a single die set is capable of producing clips suited for use in several different molding installations.

As shown in Figs. 7 and 8 the shank elements 10, 11, present, in normal untensioned relation, substantial guide edges adapted to engage the walls of the opening or perforation in the support to cause a contraction of the shank elements to tensioned relation to ensure a snap-fastening action in anchored engagement therein. In this relation the attaching clips embodied in this invention are admirably suited for quick insertion in the apertures in that the leading ends thereof, being in the form of a substantial U present a pilot 9, which facilitates application of the devices in the apertures preparatory to the operation of springing the shank elements to home position in mounting the molding or trim strip on the support. It will be noted that the head sections comprising portions 21, 23, and 20, 22, are spaced apart, Figs. 7 and 8, in normal untensioned relation, a distance somewhat greater than the inner area of the molding and the space between the opposed edges of the inturned flanges B, C.

Thus, when it is desired to secure a molding by means of such attaching clips, it is only necessary to compress the shank elements of the clips and insert the head sections thereof within the hollow molding, preferably from an end thereof, whereupon they may be slid along the molding to desired position in registry with the apertures or openings in the supporting structure when the molding is applied thereto. The spring bearing elements 24, 25 of the head sections, being resilient, not only permit the shank elements to be readily compressed to facilitate assembly of the head sections in the molding, but also, by reason of their abutting relation, exert an unusual transverse pressure or tension causing an expanding movement of the head sections when pressure is removed from the shank elements, thereby effecting a frictional engagement of the head portions 22, 23 with the inner surfaces of the molding to retain the clip in applied position in assembled relation with the molding preparatory to the application of the assembly to the support. In this relation portions 20, 21, of the head sections are snugly seated in bearing engagement with the inturned flanges B, C, of the molding A such that no relative axial movement of the clips in assembled relation with the molding is permitted.

This form of the improved attaching clip may also be assembled with the molding in another method involving a rotary turning movement of the head sections of the clip into engagement with the base flanges B, C, of the molding or trim strip. In this method, the individual clips first are positioned longitudinally in the trough of the molding in desired assembled position, the head members being disposed intermediate the opposed edges of the inturned flanges B, C. Then, by turning the clips through a 90 degree angle the head portions 20, 21, thereof are disposed in engagement with the said inturned flanges B, C, with the sections 22, 23 in frictional engagement with the roof of the molding.

It will be understood, that due to the resiliency of the metal used for fabricating the clips and also by virtue of the spring pressure bearing sections 24, 25, extraordinary resiliency is inherent in the head sections such that they yield sufficient to permit a quick, easy assembly with a molding in either of the foregoing described methods. It will also be appreciated that the engagement of the head portions 20, 21 with the inturned flanges B, C, of the molding and also the frictional engagement of the sections 22, 23 with the roof of the molding, serve to retain the clip in applied position lengthwise of the molding, which position is predetermined as by the spacing of the apertures in the supporting member in order that the shank elements thereof be in exact registry therewith to ensure a ready application of the shank elements thereto in mounting the molding or trim strip.

Since the shoulders 12, 13, extend out of the planes of the shank sections 10, 11, said shoulders may be so designed that when the assembly of the molding and clips is applied to the apertures in the support, the side walls of the apertures become seated in rigid, anchored engagement with the shoulders of the clips to positively retain the molding or trim strip in applied mounted position. Since the shank elements when untensioned, Figs. 7 and 8, have a spacing normally greater than the apertures, on being advanced in the apertures, the longitudinal edges of the shank elements will cam the side-walls thereof such that they are contracted through their inherent resiliency and also by virtue of the yieldable, spring pressure elements 24, 25 whereupon the said shoulders 12, 13 thereon may be snapped into anchored engagement in the apertures. When seated in anchored engagement, the abutting relation of the pressure bearing elements 24, 25 is such as to urge the shank elements to spaced apart relation with the shoulders 12, 13 in substantially locked relation with the hole in the support, whereby the clips are rigidly maintained in effective position at all times and under all conditions of strain, jarring, and vibration which may take place in the supporting member.

From the foregoing it will be understood that in the procedure of mounting hollow moldings on a support in manners above described, as many attaching clips as are necessary are assembled with the molding in spaced relation corresponding to the spacing of the apertures provided in the supporting member. The molding is then ready for application to the support and in applying the same to a supporting structure S, the protruding shanks of the clips which project beyond the inturned flanges B, C of the molding, are readily entered into the apertures by reason of their substantial pilot or leading ends 9 and on axial pressure applied against the top of the molding the shanks of clips are easily advanced to home position in the apertures. Since the head sections 22, 23 are in snug engagement with the roof of the molding they serve to prevent the shanks of the clips from becoming dislodged or removed from effective engagement with the molding in the operation of forcing the shanks through the openings. Thus as the attaching clips are advanced in the openings, the said shank elements 10, 11, may be compressed toward each other and placed in tensioned engagement without disturbing the frictional engagement and snug seating of the head sections in the molding.

The frictional engagement of the head sections in assembled relation in the molding is such that they are so firmly retained therein that the clips cannot move from their applied position. This is most important in mass production since a plurality of moldings can thus be prepared and piled ready for use with the assurance that the clips will be in the desired position in registry with the holes in the supporting structure when the operation of the mounting of the molding on the supporting structure is undertaken. However, if there should be minute variations in the positioning of the clips in the molding such that they are not in exact registry with the holes provided in the supporting structure, the clips may be manually moved to correct any such discrepancy simply by squeezing the shank elements such that the head sections have a slight clearance in the molding and thus are capable of sliding movement therein whereupon such clips which are out of position may be placed in exact registry with the holes in the supporting structure and the molding then fully mounted in position.

Figs. 9 to 13 inclusive show a modified molding construction embodying a clip having substantially the same function and use as the preferred form described above but having an important advantage in that the same may be constructed from considerably less material thereby involving a marked saving in the costs of manufacture. In another relation, this form of clip is advantageous in that it may be applied in assembled relation with the molding or trim strip in a substantial snap-stud action thereby speeding up assembling operations and dispensing with special assembling machines. As shown in Fig. 9, this form of the clip embodies a pair of shank sections 30, 31 carrying the head member comprising sections 42, 43 the extremities of which are deformed into pressure bearing elements 44, 45 adapted to be disposed in abutting relation. At suitable points intermediate the lengths of the said sections 30, 31, inclined shoulders 32, 33 are provided by indents or deformations of the shank sections to project the same out of the planes thereof as shown particularly in Figs. 10 and 13. Next adjacent the said shoulders 32, 33, the head sections are provided with pronounced shoulders 40, 41 which together act as a substantial snap-stud means facilitating assembling of the clip with the molding. Inasmuch as the pressure bearing elements 44, 45 are resilient and permit a yieldable action in the head sections this form of the attaching clip may be readily assembled with the molding simply by a substantial axial push of the head sections to seat the shoulders 40, 41 between the opposed edges of the inturned flanges B', C', with the head sections 42, 43 in abutting relation with the roof of the molding as shown in Fig. 10. Thus when an axial force is applied in mounting the molding the shank sections of the attaching clip may be readily entered and advanced to home position in the aperture provided in the supporting structure S' to a position where the said inclined shoulders 32, 33 have substantial anchoring engagement in the aperture. As in the preferred form described above with reference to Figs. 1 to 8 inclusive, the abutting relation of the resilient pressure bearing sections 44, 45 tends to force the shank sections 30, 31 in spaced apart relation such that the said shoulders 32, 33 are urged at all times and under all conditions to anchored engagement in the aperture. The attaching clip of this form is also advantageous in that the inclined shoulders 32, 33, are provided simply by deforming the metal into indents without in any way severing the metal as in the preferred form in which slots are provided for obtaining the inclined shoulders. In providing the shoulders by slots, trouble is sometimes experienced with the punching tools in that the cut-outs from the slots interfere with the operation of the punching tools and occasionally cause the same to become fractured or broken involving a delay and objectionable expense to replace the same. In the form of attaching clip proposed in Figs. 9 to 13 inclusive, the shoulders 32, 33 being provided by a simple deforming operation there are no cut-outs which may cause damage to the punching tools and accordingly, the dies therefore may be economically constructed with very little possibility of damage to the tools throughout the length of period of practical use.

While this invention has been described in detail with specific examples such examples are illustrative only, since it will be apparent to those skilled in the art that other modifications within the spirit and scope of the invention may be constructed without departing from the teachings or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A clip adapted to be applied to an aperture in a supporting structure in substantial locking engagement therewith, said clip comprising a strip of sheet metal having a bend providing a pair of opposing spaced shank elements, head sections provided from the free ends of said shank elements, said head sections having portions extending inwardly toward each other and including yieldable pressure elements abutting each other to maintain said shank elements in a normal spaced relation greater than the size of said aperture, one of said shank elements having a shoulder projecting outwardly out of the plane thereof adapted for anchoring engagement in said aperture in the supporting structure under the expansive force exerted by said pressure elements of the head sections to urge said shank elements toward their normal spaced relation greater than the size of said aperture.

2. A clip adapted to be applied to an aperture in a supporting structure in substantial locking engagement therewith, said clip comprising a strip of sheet metal having a bend providing a pair of opposing spaced shank elements, head sections provided from the free ends of said shank elements, said head sections having portions extending inwardly toward each other and including yieldable pressure elements abutting each other to maintain said shank elements in a normal spaced relation greater than the size of said aperture, one of said shank elements having a shoulder on its longitudinal edge adjacent the head section provided thereon, said shoulder projecting outwardly out of the plane of said shank element and being adapted for anchoring engagement in said aperture in the supporting structure under the expansive force exerted by said pressure elements of the head sections to urge said shank elements toward their normal spaced relation greater than the size of said aperture.

3. A clip adapted to be applied to an aperture in a supporting structure in substantial locking engagement therewith, said clip comprising a strip of sheet metal having a bend providing a pair of opposing spaced shank elements, head sections provided from the free ends of said shank elements, said head sections having portions extending inwardly toward each other and including yieldable pressure elements abutting each other to maintain said shank elements in a normal spaced relation greater than the size of said aperture, said shank elements having their longitudinal edges deformed adjacent said head sections to provide substantial shoulders, said shoulders projecting outwardly out of the planes of said shank elements and being adapted for anchoring engagement in said aperture in the supporting structure under the expansive force exerted by said pressure elements of the head sections to urge said shank elements toward their normal spaced relation greater than the size of said aperture.

4. A clip adapted to be applied to an aperture in a supporting structure in substantial locking engagement therewith, said clip comprising a strip of sheet metal having a bend providing a pair of opposing spaced shank elements, head sections provided from the free ends of said shank elements, said head sections having portions extending inwardly toward each other and including yieldable pressure elements abutting each other to maintain said shank elements in a normal spaced relation greater than the size of said aperture, one of said shank elements having a substantial slot on its longitudinal edge adjacent the head section thereon presenting a shoulder, said shoulder projecting outwardly out of the plane of said shank element and being adapted for anchoring engagement in said aperture in the supporting structure under the expansive force exerted by said pressure elements of the head sections to urge said shank elements toward their normal spaced relation greater than the size of said aperture.

5. A clip adapted to be applied to an aperture in a supporting structure in substantial locking engagement therewith, said clip comprising a strip of sheet metal having a bend providing a pair of opposed spaced shank elements, head sections provided from the free ends of said shank elements, said head sections having portions extending inwardly toward each other and including yieldable pressure elements abutting each other to maintain said shank elements in a normal spaced relation greater than the size of said aperture, one of said shank elements having a substantial slot on its longitudinal edge adjacent the head section thereon presenting a shoulder, the longitudinal edge portion of said shank element adjoining said slot being bent to project said shoulder outwardly out of the plane thereof, said shoulder being adapted for anchoring engagement in said aperture in the supporting structure under the expansive force exerted by said pressure elements of the head sections to urge said shank elements toward their normal spaced relation greater than the size of said aperture.

6. A clip adapted to be applied to an aperture in a supporting structure in substantial locking engagement therewith, said clip comprising a strip of sheet metal having a bend providing a pair of opposing spaced shank elements, head sections provided from the free ends of said shank elements, said head sections having portions extending inwardly toward each other and including yieldable pressure elements abutting each other to maintain said shank elements in a normal spaced relation greater than the size of said aperture, said shank elements having substantial slots on their longitudinal edges adjacent said head sections presenting shoulders, the longitudinal edge portions of said shank elements adjoining said slots being bent to project said shoulders outwardly out of the planes thereof, said shoulders being adapted for anchoring engagement in said aperture in the supporting structure under the expansive force exerted by said pressure elements of the head sections to urge said shank elements toward their normal spaced relation greater than the size of said aperture.

7. A clip adapted to be applied to an aperture in a supporting structure in substantial locking engagement therewith, said clip comprising a strip of sheet metal having a bend providing a pair of opposing spaced shank elements, head sections provided from the free ends of said shank elements, said head sections having portions extending inwardly toward each other and including yieldable pressure elements abutting each other to maintain said shank elements in a normal spaced relation greater than the size of said aperture, one of said shank elements having a depression on its longitudinal edge adjacent the head section thereon presenting a substantial shoulder projecting outwardly out of the plane of said shank element, said shoulder being adapted for anchoring engagement in said aperture in the supporting structure under the expansive force exerted by said pressure elements of the head sections to urge said shank elements toward their normal spaced relation greater than the size of said aperture.

8. A clip for mounting a hollow molding having spaced inturned flanges onto an apertured supporting structure, said clip having a head member comprising cooperating, yieldable sections including pressure bearing elements bent substantially at right angles thereto presenting surfaces in abuttable relation to urge the head sections toward connected engagement with the said inturned flanges of the molding when assembled therewith, said clip having a projecting shank comprising a pair of shank elements at least one of which is provided with a shoulder deformed therefrom outwardly out of the plane thereof and adapted for anchoring engagement in the aperture in the supporting structure under tension exerted by the said pressure bearing elements of the head sections on the said shank elements.

9. A clip for mounting a hollow molding or like object onto an apertured supporting member, said clip embodying a head member and a projecting shank adapted for anchoring engagement in the aperture in the supporting member when applied thereto, said head member comprising a pair of cooperating yieldable head sections having pressure elements bent substantially at right angles thereto presenting surfaces disposed in abutting relation to urge the said head sections to rigid connected engagement with the molding when assembled therewith, said shank comprising a pair of shank elements integrally united to form a leading end and having shoulders deformed therefrom outwardly out of the planes thereof maintained in anchored engagement in the aperture in the supporting member under tension exerted on the shank elements by the said pressure elements of the head sections.

10. A clip for mounting a hollow molding having spaced inturned flanges onto an apertured supporting structure, said clip having a head member comprising cooperating yieldable sections conforming to the inner contour of the molding and including inturned pressure bearing elements disposed in abutting relation to urge the head sections in an expanding action to rigid connected engagement with the molding when assembled therewith, said clip having a projecting shank comprising a pair of shank elements spaced normally a distance greater than the size of the aperture and provided with shoulders deformed outwardly from the planes thereof and maintained in anchored engagement in the aperture in the supporting structure under tension supplied by the said pressure bearing elements of the head sections to the said shank elements in urging them to spaced apart relation in the applied mounted position of the molding on the supporting structure.

11. A clip for mounting a hollow molding or like object onto an apertured supporting member, said clip embodying a head member and a projecting shank adapted for anchoring engagement in the aperture in the supporting member when applied thereto, said head member comprising a pair of cooperating, yieldable head sections conforming to the inner contour of the molding and having inturned pressure elements disposed in abutting relation to urge the said head sections to rigid connected engagement with the molding when assembled therewith, said projecting shank comprising a pair of spaced shank elements integrally united to form a leading end and having shoulders on their longitudinal edges deformed outwardly of the planes thereof and maintained in anchored engagement in the aperture in the supporting member under tension exerted by the pressure elements on the shank elements in urging the same to spaced relation in the applied mounted position of the molding on the supporting member.

12. A clip for mounting a hollow molding having spaced inturned flanges onto an apertured supporting structure, said clip having a head member comprising cooperating yieldable sections adapted for snap-fastening engagement with the opposed edges of said inturned flanges and including pressure bearing elements bent substantially at right angles thereto presenting surfaces disposed in abutting relation to maintain the head sections in rigid connected engagement with the molding when assembled therewith, said clip having a projecting shank comprising a pair of shank elements provided with shoulders deformed therefrom outwardly out of the planes thereof and adapted for anchoring engagement in the aperture in the supporting structure.

13. A clip for mounting a hollow molding having spaced inturned flanges onto an apertured supporting member, said clip embodying a head member and a projecting shank adapted for anchoring engagement in the aperture in the supporting member when applied thereto, said head member comprising a pair of cooperating, yieldable head sections adapted for snap-fastening engagement with the opposed edges of the inturned flanges of the molding and having inturned pressure elements disposed in abutting relation to maintain said head sections in rigid connected engagement with the molding when assembled therewith, said shank comprising a pair of spaced shank elements integrally united to form a leading end and having shoulders deformed therefrom outwardly out of the planes thereof maintained in anchored engagement in the aperture in the supporting member under tension exerted on the shank elements by said pressure elements.

14. A clip for mounting a hollow molding having spaced inturned flanges onto an apertured supporting structure, said clip having a head member comprising cooperating yieldable sections adapted for snap-fastening engagement with the opposed edges of the inturned flanges of the molding and including inturned pressure bearing elements disposed in abutting relation to maintain the head sections in rigid connected engagement with the molding when assembled therewith, said clip having a projecting shank comprising a pair of shank elements spaced normally a distance greater than the size of the aperture and provided with shoulders on their longitudinal edges deformed outwardly of the planes thereof and adapted for anchoring engagement in the aperture in the supporting structure under tension supplied by the said pressure bearing elements of the head sections on the said shank elements in urging them to spaced apart relation in the applied mounted position of the molding on the supporting structure.

GEORGE A. TINNERMAN.